R. P. OSGOOD.
ELECTRIC HOT WATER HEATER.
APPLICATION FILED JUNE 24, 1920.
1,356,881.
Patented Oct. 26, 1920.
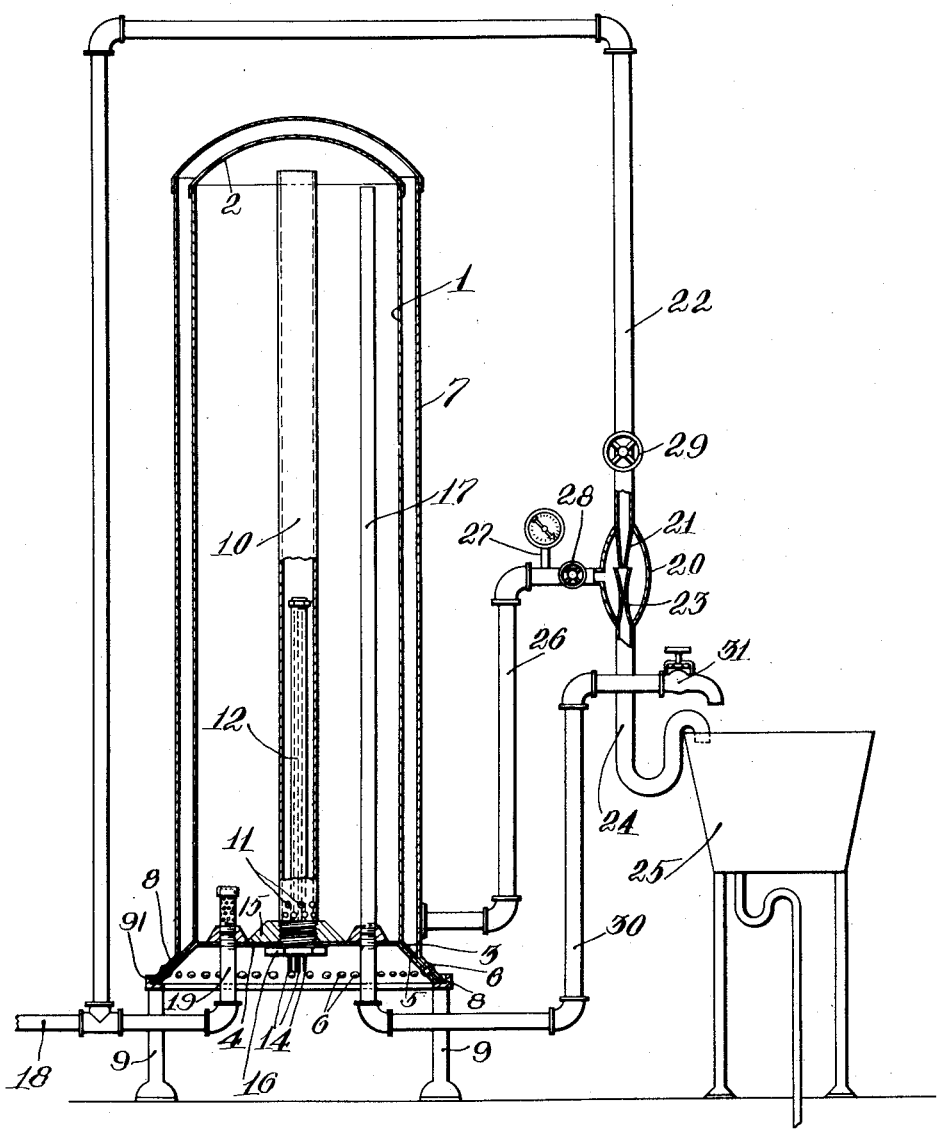
Inventor:
Richard P. Osgood

UNITED STATES PATENT OFFICE.

RICHARD P. OSGOOD, OF WINDSOR, VERMONT.

ELECTRIC HOT-WATER HEATER.

1,356,881.  Specification of Letters Patent.  Patented Oct. 26, 1920.

Application filed June 24, 1920. Serial No. 391,270.

*To all whom it may concern:*

Be it known that I, RICHARD P. OSGOOD, citizen of the United States, residing at Windsor, in the county of Windsor and State of Vermont, have invented new and useful Improvements in Electric Hot-Water Heaters, of which the following is a specification.

The present invention has for its particular object to provide a hot water heater for use in dwellings, barber shops and the like, though, as will be seen from the subsequent description, it is capable of being employed for large installations if desired.

As has already been recognized, to prevent loss of heat, it is desirable to inclose the tank within a vacuum jacket or casing, and one feature of the present invention comprises simple but effective connections for exhausting the air therefrom. Other features of the invention reside in the arrangement of the electrical heating unit and an open column arranged in the tank by which the water may be rapidly heated and delivered to the top of the tank, in the arrangement of the outlet pipe through the bottom of the tank, to prevent loss of heat, and in the construction of the tank itself by which heat is conserved by preventing the conduction thereof from the tank to the vacuum jacket.

The accompanying drawing illustrates an embodiment of my invention suitable for use in a dwelling.

On the drawing, a cylindrical metal tank 1 is shown having the usual dome 2. The lower end of the tank is flared outwardly at 3, and to it is secured the flared margin 5 of a lower end plate 4 by a plurality of rivets 6. Inclosing the tank is a vacuum jacket or casing 7, and having it side and dome spaced from the tank a suitable distance, e. g., an inch more or less. The lower end of the jacket is formed with a frusto-conical flange 8 which fits on the like flanges 3 and 5, and is secured thereto by the said rivets 6. By this construction, the jacket is suitably braced and held in proper relation to the tank, but, more important, the connections between the tank and the jacket are exterior and are located at that part of the tank where the water is coolest. The structure thus described is supported upon a flanged ring 91 and suitable legs or standards 9. I prefer to heat the water in the tank by electricity, though for some purposes the electrical heating mechanism may be omitted. As shown, there is a standpipe 10 in the tank, which has an open upper end terminating near the dome, and having a plurality of lateral apertures 11 in its lower end into which the cold water may enter. This pipe contains suitable electrical heating units, conventionally illustrated at 12, the conductors for which are shown at 14. The pipe is secured at its lower extremity by any suitable means to a thick reinforcing plate 15 secured to the bottom plate 4. A member 16, on which the electrical heating units are supported, is screwed into a threaded aperture in the plates 4 and 15 as shown, and may be withdrawn for repair of the parts carried thereby as desired. As shown, the cool water enters the lower end of the standpipe, and is heated and delivered therefrom at the top of the tank, from which it may be drawn by the outlet pipe 17. This pipe has its upper end terminating at a point near the dome, and it extends downwardly through the bottom wall 4 of the tank, and thus does not pass through the vacuum jacket—a feature which I regard as most desirable, for while it passes through zones of cooler water, it does not permit the conduction of heat from the tank to the jacket, and a consequent dissipation and wastage of heat units.

The usual service pipe is shown at 18. It has a branch 19 which extends through the bottom wall of the tank and terminates closely thereto, to supply cold water to the tank.

I provide, as previously indicated, simple means by which air may be exhausted from the vacuum jacket, this taking the form of an ejector or Sprengel pump. To this end I employ a bulb 20, into one end of which projects a reduced nozzle 21 located at the end of a branch pipe 22 connected to the high service supply pipe 18. A nozzle 23 which flares at both ends and is contracted in the middle, extends into the lower end of the bulb, and is located at the end of a trapped pipe 24 which is shown as discharging into a tub 25. From the side of the bulb or ejector casing, a pipe 26 leads to the lower end of the vacuum jacket and communicates with the interior thereof at a point where any water of condensation will be withdrawn when the air is exhausted. The pipe 26 is equipped with a vacuum gage 27 and also with a shut-off valve 28. The pipe 22 is, of course, provided with a valve 29. For purpose of illustration, I have shown the hot water delivery pipe 30, which is connected to the pipe 17, as being provided with a faucet 31 located over the tub 25.

By the apparatus as described, I am able to exhaust the air from the jacket to produce a vacuum of 25 to 27 inches, which is sufficient for all general purposes, and this being done, it is possible to prevent any material loss of heat from the water in the tank. The bottom wall is unprotected, it is true, but this is located below the zone of the coolest water, and but a negligible loss of heat is suffered at this level.

Of course, any other form of ejector may be employed in connection with the service pipe for exhausting the air from the vacuum jacket, and I have no intention of limiting myself to the particular form shown.

The combination of instrumentalities shown is efficacious, simple, durable and comparatively inexpensive to install and operate. The employment of the central standpipe or flue, with the heating units therein, makes for a rapid and economical heating of the water and prevents the hot water from mingling with the water in the cooler zones.

Any suitable form of electrical immersion heating unit may be employed in the heater, and, as the invention does not reside in such unit *per se*, I have not illustrated it in detail. Of course, such unit should be properly incased, so as not to permit access of water to the current-carrying elements.

I have herein called attention to several advantages flowing from the connection of the vacuum jacket to the tank at the bottom thereof, and I may add thereto that, by reason of this construction, relative longitudinal expansion and contraction of the jacket and tank are permitted to take place freely, without danger of straining or weakening them or causing leakage or impairing the vacuum. The jacket and the tank may be formed of different metals which have different coefficients of expansion, and hence a more inexpensive material may be employed in the construction of the jacket than in making the tank.

What I claim is:—

1. A hot water apparatus, comprising a tank, an inclosing vacuum jacket secured thereto at the lower end thereof, and inlet and discharge pipes passing through the bottom of said tank.

2. A hot water apparatus, comprising a cylindrical tank having a flaring lower end, and a vacuum jacket inclosing said tank and having a flaring lower end secured to the said flaring end of said tank.

3. A hot water apparatus, comprising a cylindrical tank having a bottom wall, the side wall and bottom wall terminating in outwardly and downwardly flaring flanges, and a vacuum jacket inclosing the said tank and having at its lower end a flaring flange resting on and secured to the first mentioned flanges.

4. A hot water apparatus, comprising a cylindrical tank having a bottom wall, the side wall and bottom wall terminating in outwardly and downwardly flaring flanges, a vacuum jacket inclosing the said tank and having at its lower end a flaring flange resting on and secured to the first mentioned flanges, and inlet and outlet pipes feeding and discharging water through said bottom wall.

5. A hot water apparatus comprising a tank, a vacuum jacket therefor, a supply pipe for delivering water to said tank, an ejector vacuum pump connected to the said jacket, and pipe connections communicating with said supply pipe for delivering water to said ejector.

6. A hot water apparatus comprising an upright vacuum jacketed tank, a vertical standpipe therein open at both ends, and an electrical heating unit located in said standpipe.

7. A hot water apparatus comprising an upright vacuum jacketed tank, a vertical standpipe therein open at both ends, an electrical heating unit located in said standpipe, and a hot water delivery extending through the lower end of the tank and terminating at the upper end of the tank.

8. A hot water apparatus comprising an upright vacuum jacketed tank, a vertical standpipe therein open at both ends, an electrical heating unit located in said standpipe, and inlet and discharge pipes entering the tank at the bottom thereof, said pipes terminating near the upper and lower ends, respectively, of the tank.

In testimony whereof I have affixed my signature.

RICHARD P. OSGOOD.